United States Patent [19]

Nagae

[11] Patent Number: 5,598,530

[45] Date of Patent: Jan. 28, 1997

[54] METHOD AND APPARATUS FOR CONTROLLING USING CHECKSUMS EXECUTION OF OBJECT PROGRAMS

[75] Inventor: Takaaki Nagae, Kawasaki, Japan

[73] Assignee: Fujitsu Limited, Kawasaki, Japan

[21] Appl. No.: 421,285

[22] Filed: Apr. 13, 1995

Related U.S. Application Data

[63] Continuation of Ser. No. 121,576, Sep. 16, 1993, abandoned.

[30] Foreign Application Priority Data

Feb. 16, 1993 [JP] Japan ................................. 5-026330

[51] Int. Cl.$^6$ ........................... G06F 11/00; G06F 11/10
[52] U.S. Cl. ................... 395/182.19; 371/20.1; 371/37.7
[58] Field of Search .............. 395/182.19; 371/37.7, 371/20.1

[56] References Cited

U.S. PATENT DOCUMENTS

| | | | |
|---|---|---|---|
| 4,142,243 | 2/1979 | Bishop et al. | 395/575 |
| 4,519,077 | 5/1985 | Amin | 371/21.5 |
| 4,914,576 | 4/1990 | Zelley et al. | 395/182.19 |
| 5,022,077 | 6/1991 | Bealkowski et al. | 380/4 |
| 5,050,212 | 9/1991 | Dyson | 380/25 |
| 5,319,651 | 6/1994 | Eder et al. | 321/54 |
| 5,328,278 | 7/1994 | Kokubo | 400/74 |

OTHER PUBLICATIONS

Fred Cohen "A Crytographic Checksum for Integrity Production" Dec. 1987.
Russell Davis "Exploring Computer Viruses" 1988 Ford Aerospace Space Missions Group.
S. J. Phillippo "Practical Virus Detection and Prevention" 1990.
Jackson, Keith "Checkson Methods Used to Detect Virus Attacks" Virus Bulletin Sep. 1989 pp. 7–8.

*Primary Examiner*—Krisna Lim
*Attorney, Agent, or Firm*—Staas & Halsey

[57] ABSTRACT

A program execution control device for a computer system is provided for improving the reliability of program execution. A first calculating unit calculates, as a first checksum, the checksum of data which is already stored in main memory before an object program is loaded into the main memory. A program copying unit makes a copy of the object program stored in a storage unit and loads the copy into the main memory. An adding unit acquires, as a second checksum, a checksum of the object program, which checksum is obtained previously when the object program is compiled and is affixed to the object program as auxiliary data, and adds together the second checksum and the first checksum to obtain a third checksum. A second calculating unit calculates, as a fourth checksum, the checksum of data stored in the main memory after the object program is loaded into the main memory. An execution control unit compares the third checksum with the fourth checksum. The execution control unit executes the object program when the third and fourth checksums coincide, and inhibits execution of the object program when the third and fourth checksums do not coincide.

13 Claims, 5 Drawing Sheets

METHOD AND APPARATUS FOR CONTROLLING USING CHECKSUMS EXECUTION OF OBJECT PROGRAMS

This application is a continuation, of application Ser. No. 08/121,576, filed Sep. 16, 1993, now abandoned.

BACKGROUND OF THE INVENTION

(1) Field of the Invention

The present invention relates to a program execution control device for a computer system, and more particularly, to a program execution control device for copying an object program stored in external storage means to a main memory and controlling execution of the program.

(2) Description of the Related Art

Binary-coded object programs executable by a computer system are created in the following manner. First, programs called source programs described in a source language (programming language) are compiled using a compiler, to prepare object modules. Then, using a linker, the object modules are combined with predetermined libraries to produce object programs. During the combining operation, the linker calculates the checksum of the entire combination of the object module and library and affixes the calculated checksum to a predetermined location in the object program as auxiliary data.

Object programs created in this manner are generally constructed in a dynamically relocatable fashion. Thus, when an object program stored in an external storage such as a hard disk is executed, an operating system (OS) loads the object program into the main memory while relocating the object program, or more specificaly, while converting address information contained in the object program. The OS then sets registers in the processor that are necessary for the execution of the object program.

In recent years, programs called computer viruses have spread, causing damages such as destruction of important files. If a computer virus infects a certain object program, the program runs abnormally, presenting a phenomenon that a strange screen appears at the display device upon lapse of a certain period of time or part or all of the files stored in the external storage or the like is destroyed. Computer viruses can infect not only the object programs as aforesaid but other object programs such as OS or shell, causing even greater damage. In the event a computer virus enters a computer system serving as a host station of a networked on-line system, such as the one used in banking facilities, the damage caused is unrecoverable.

The phenomenon described above can also occur in situations where a bit loss has occurred in the object program stored in the external storage, due to a change with time of the external storage or the like, or where a burst error occurs when the object program is copied from the external storage to the main memory, due to external noise such as alpha rays or impulses.

With conventional computer systems and OS, it is not possible to determine in advance whether the object program copied from the external storage to the main memory is damaged by a computer virus, or whether a bit loss or burst error has occurred in the object program due to time-based change, external noise or other causes.

SUMMARY OF THE INVENTION

An object of the present invention is to provide a program execution control device capable of prohibiting the execution of an object program which has developed abnormality after compiling, thereby enhancing the reliability of a computer system.

To achieve the above object, the present invention provides a program execution control device. The program execution control device comprises a first calculating unit for calculating, as a first checksum, the checksum of data which is already stored in a main memory before an object program is loaded into the main memory, a program copying unit for making a copy of the object program stored in external storage unit and loading the copy into the main memory, an adding unit for acquiring, as a second checksum, a checksum of the object program, which checksum is obtained previously when the object program is compiled and is affixed to the object program as auxiliary data, and for adding together the second checksum and the first checksum to obtain a third checksum, a second calculating unit for calculating, as a fourth checksum, the checksum of data stored in the main memory after the object program is loaded into the main memory, and an execution control unit for comparing the third checksum with the fourth checksum. The execution control unit executes the object program when the third and fourth checksums coincide, and inhibits execution of the object program when the third and fourth checksums do not coincide.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment according to the present invention will be outlined first.

Figure 1:
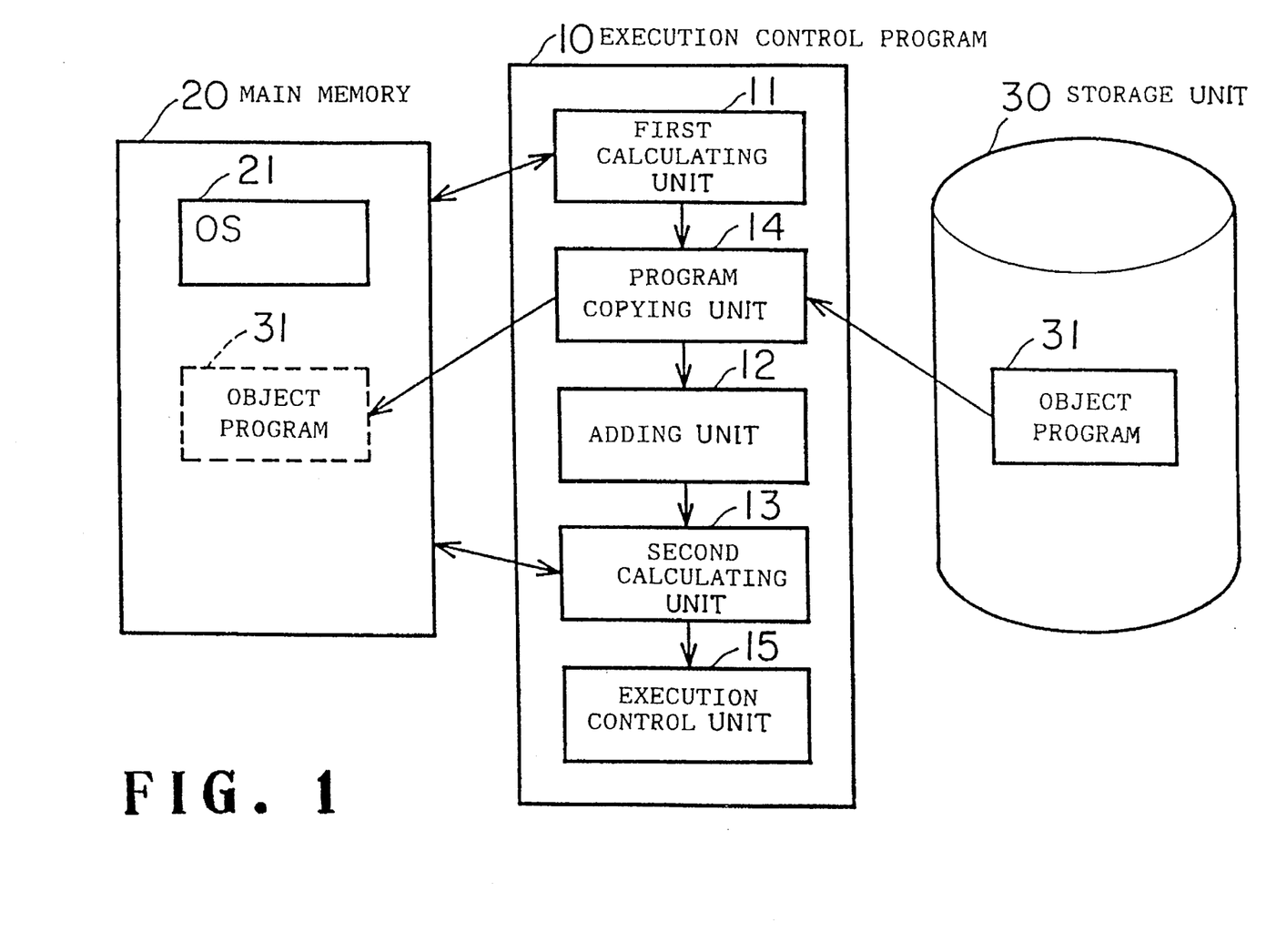
FIG. 1 is a diagram illustrating principles of an embodiment of the present invention.

FIG. 1 illustrates the principles of the embodiment of the invention. A program execution control device according to this embodiment comprises various elements including first a calculating unit 11, an adding unit 12, second calculating unit 13, program copying unit 14, and an execution control unit 15. These elements represent the functions achieved by running an execution control program 10.

The first calculating unit 11 calculates the checksum of data already stored in a main memory 20 before an object program 31 is loaded into the main memory 20, and sets the calculated checksum as a first checksum. In this case, the programs already stored in the main memory 20 include an OS (operating system) 21, etc., and the first checksum represents the checksum of the OS 21, etc. It is here assumed that the storage area of the main memory 20 other than the area in which the OS 21, etc. are stored has been cleared to zero.

The program copying unit 14 makes a copy of the object program 31 stored in storage unit 30 and loads the copy into the main memory 20. The adding unit 12 acquires, as a second checksum, the checksum affixed to the object program 31, and adds the second checksum to the first checksum calculated by the first calculating unit 11, to obtain a third checksum. The checksum affixed to the object program 31 is obtained previously when the object program 31 is compiled, and is affixed to the program 31 as auxiliary data associated therewith.

The third checksum represents a computational checksum of data stored in the main memory 20 on the assumption that the object program which has just been obtained by compilation and is free from abnormality, such as a computer virus, external noise and the like, is loaded into the main memory 20.

Subsequently, the second calculating unit 13 actually loads the object program, which may have developed an abnormality while being stored in the storage unit 30 after compiling, into the main memory 20, calculates the checksum of the data then loaded into the main memory 20, and sets the calculated checksum as a fourth checksum.

The execution control unit 15 compares the third checksum (computational checksum) with the fourth checksum (actual checksum). If the two checksums coincide, the execution control unit 15 concludes that no abnormality has occurred in the object program 31, and thus executes the object program 31; if the two checksums do not coincide, the execution control unit 15 concludes that the object program 31 has developed abnormality, and inhibits the execution of the object program 31 and at the same time deletes the program 31 from the storage means 30.

The third checksum and the fourth checksum do not coincide if the object program has been destroyed by a computer virus or a bit loss or burst error has occurred in the object program, and the execution of such program is inhibited by the execution control unit 15, whereby the reliability of the computer system is improved.

The embodiment of the present invention will be now described in detail.

Figure 2:
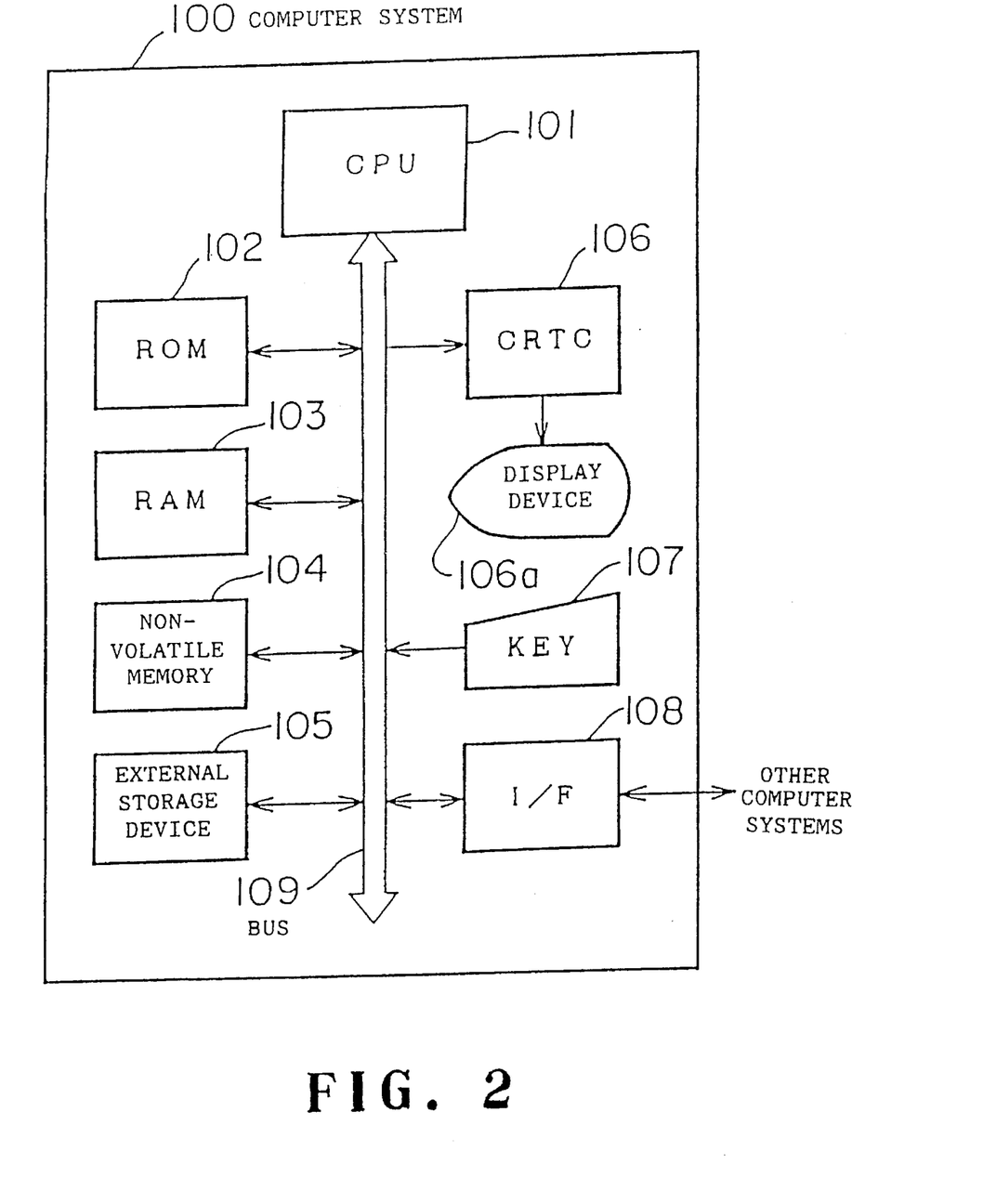
FIG. 2 is a block diagram showing an example of hardware arrangement of a computer system.

FIG. 2 is a block diagram showing an example of hardware arrangement of a computer system including the program execution control device. A computer system 100, which is a workstation or a personal computer, comprises various hardware components including a processor (hereinafter referred to as "CPU") 101, a ROM 102, a RAM 103, a nonvolatile memory 104, an external storage device 105, a CRT control circuit (CRTC) 106, a display device 106a, an operator control panel (KEY) 107, and an interface (I/F) 108.

The CPU 101 globally controls the computer system 100 in accordance with system programs stored in the ROM 102. An EPROM, EEPROM or the like is used for the ROM 102.

The RAM 103 comprises a DRAM, for example, and stores temporary data such as work data, and input/output signals. For the nonvolatile memory 104, a CMOS-RAM backed up by a battery (not shown) is used, in order to store data that must be retained even after the power is cut off, such as system information. The external storage device 105 comprises a hard disk drive unit or the like, and stores various data such as object programs.

The RAM 103 corresponds to the main memory 20 shown in FIG. 1, and the external storage device 105 corresponds to the storage unit 30 in FIG. 1. The functions of the first calculating unit 11, adding unit 12, second calculating unit 13, program copying unit 14, and execution control unit 15 are accomplished by executing corresponding processes in the execution control program 10 stored in the RAM 103 by the CPU 101.

The CRT control circuit 106 controls the screen display and converts digital signals supplied from the CPU 101 into video signals, which are then supplied to the display device 106a. The display device 106a comprises a CRT or liquid-crystal display device. The operator control panel 107 comprises a keyboard, mouse or the like. The interface 108 controls communications with other computer systems etc. The aforementioned components, except for the display device 106a, are connected to a bus 109.

Figure 3:
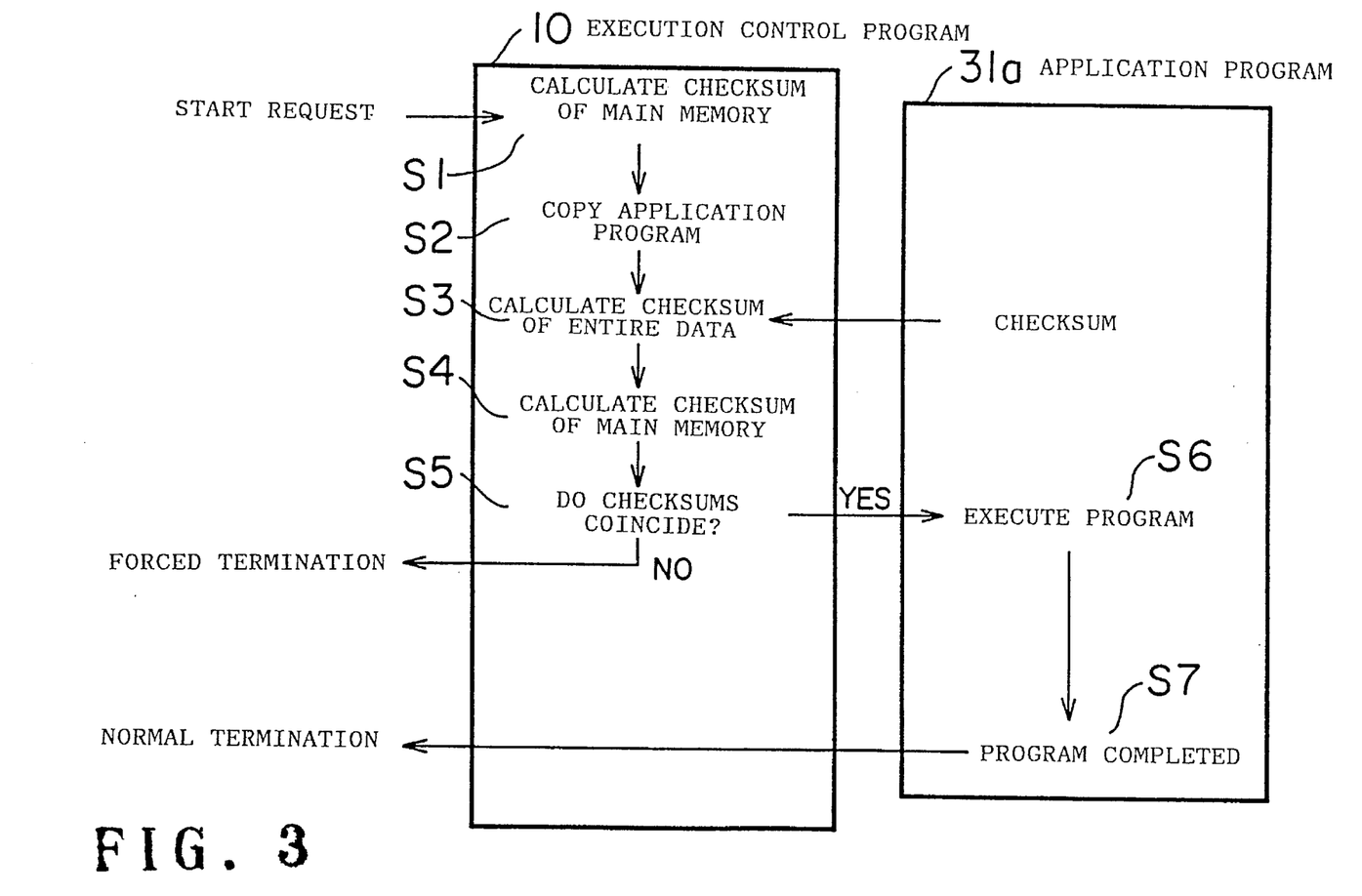
FIG. 3 is a process flowchart illustrating a process implemented by an execution control program.
Figure 4:
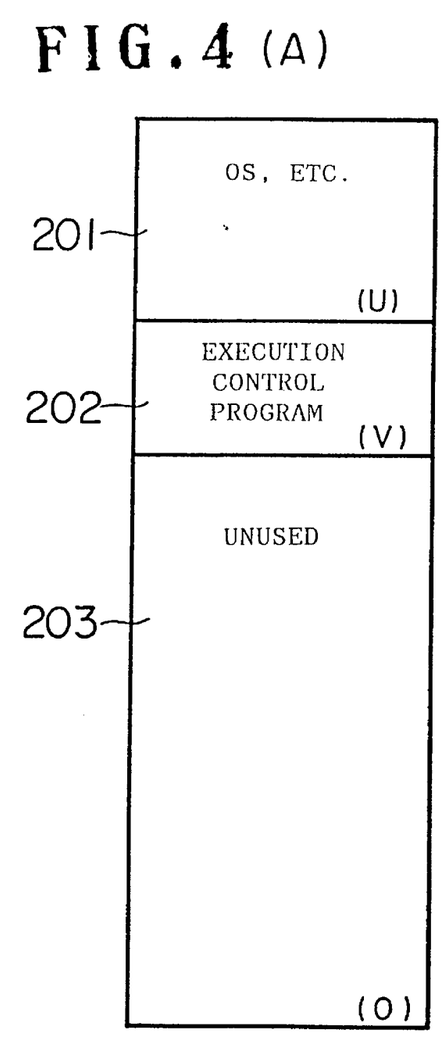
FIG. 4(A) is a diagram showing an example of how data is stored in storage partitions of a main memory before an object program is loaded.
FIG. 4(B) is a diagram showing an example of how data is stored in the storage partitions of the main memory after an object program is loaded.
Figure 5:
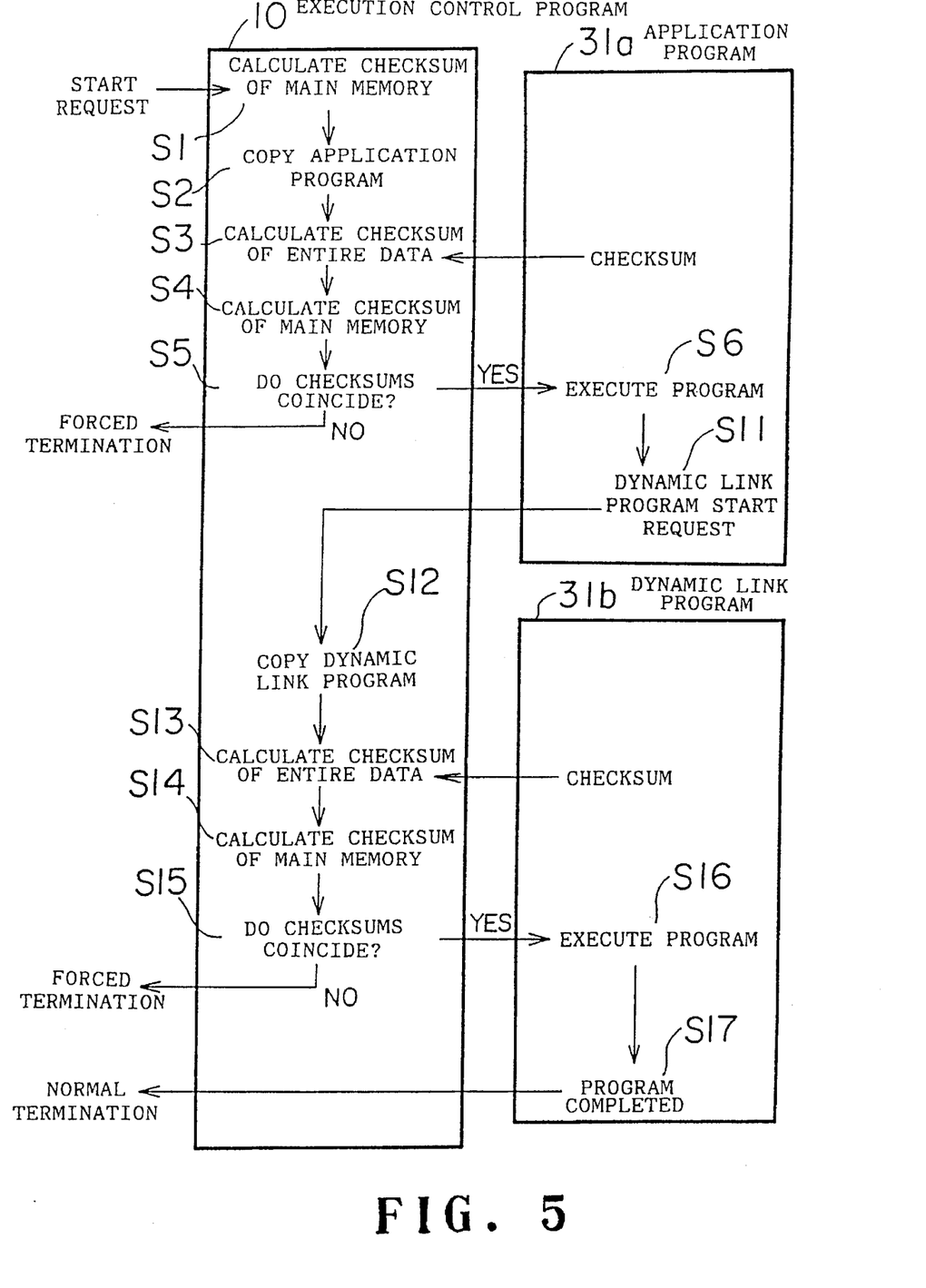
FIG. 5 is a process flowchart showing a process implemented by the execution control program when an application program includes a dynamic link program.

Referring now to FIGS. 3 to 5, the process implemented by the execution control program 10 shown in FIG. 1 will be explained. An application program 31a and a dynamic link program 31b, shown in FIGS. 3 to 5, constitute the object program 31.

FIG. 3 is a process flowchart showing the process implemented by the execution control program 10. In the chart, the numbers following "S" denote step numbers.

[S1] When a start request for the application program 31a is received from a shell, the checksum (first checksum) of the entire data already stored in the RAM 103 is calculated.

[S2] The application program 31a, for which the start request is supplied from the shell, is copied from the external storage device 105 and loaded into the RAM 103.

[S3] A checksum of the entire data in the RAM 103 that would be obtained if the application program 31a which has just been obtaned by compilation and is free from an abnormality were loaded into the RAM 103 is calculated. Specifically, the checksum (second checksum) affixed to the predetermined location in the application program 31a as the auxiliary data and the first checksum obtained in Step S1 are added together. The resulting sum is set as the third checksum.

[S4] A checksum (fourth checksum) of the entire data in the RAM 103 including the actually loaded application program 31a which may have developed an abnormality after being compiled is calculated.

[S5] It is determined whether the third checksum obtained in Step S3 coincides with the fourth checksum obtained in Step S4. If the two checksums coincide (YES), it is concluded that no abnormality has occurred in the application program 31a after compiling, and the flow proceeds to Step S6. On the other hand, if the third and fourth checksums do not coincide (NO), it is concluded that the application program 31a has developed abnormality after being compiled. Accordingly, the application program 31a stored in the external storage device 105 is deleted and a forced termination signal is output to the shell, followed by termination of the process.

[S6] The application program 31a is executed.

[S7] When the execution of the application program 31a is completed, a normal termination signal is output to the shell and the process is ended.

How the contents of the main memory 20 (RAM 103) change when the execution control program 10 is executed will be now described.

FIGS. 4(A) and 4(B) illustrates an example of storage partitions of the main memory 20 (i.e., the RAM 103), wherein FIG. 4(A) shows a state before the object program 31 (i.e., the application program 31a) is loaded, and FIG. 4(B) shows a state after the object program 31 is loaded.

As shown in FIG. 4(A), programs including the OS, device driver and shell are stored in a storage partition 201, and the checksum thereof is "U". The execution control program 10 is stored in a storage partition 202, and the checksum thereof is "V". A storage partition 203 is an unused memory area, and thus the checksum thereof is "0". Accordingly, the checksum of the entire data in the RAM 103 is "W" (=U+V), and this checksum corresponds to the aforementioned first checksum.

In FIG. 4(B), the programs including the OS, device driver and shell are stored in the storage partition 201 and the checksum thereof is "U", as in the case of FIG. 4(A). Also, the execution control program 10 is stored in the storage partition 202 and the checksum thereof is "V", as in the case of FIG. 4(A). The application program 31a is actually stored in a storage partition 203a, and the checksum thereof is "X". A storage partition 203b is an unused memory area and the checksum thereof is "0". Accordingly, the checksum of the entire data in the RAM 103 is "Y" (=U+V+X). This checksum corresponds to the aforementioned fourth checksum.

If the fourth checksum "Y" coincides with the third checksum obtained in Step S3 of FIG. 3, the application program 31a is executed. On the other hand, if these checksums do not coincide, execution of the application program 31a is inhibited.

Referring now to FIG. 5, the process implemented by the execution control program 10 when the application program 31a includes the dynamic link program 31b will be explained. The dynamic link program 31b is also called "overlay program," and is loaded into a predetermined memory area of the main memory 20 (FIG. 1) for execution in a manner laid over another object program or the like related to the application program 31a.

FIG. 5 is a process flowchart illustrating the process implemented by the execution control program 10 when the application program 31a includes the dynamic link program 31b. In FIG. 5, like step numbers are used to denote corresponding steps appearing in FIG. 3, and a description thereof is omitted.

[S11] After the application program 31a is executed in Step S6, a start request for executing the dynamic link program 31b is output from the application program 31a to the execution control program 10.

[S12] After the start request is output in Step S11, the dynamic link program 31b, which is the subject of the start request, is copied from the external storage device 105 and loaded into the RAM 103.

[S13] A checksum of the entire data in the RAM 103 that would be obtained if the dynamic link program 31b which is not yet compiled and is free from abnormality were loaded into the RAM 103 is calculated. Specifically, the checksum (twelfth checksum) affixed to a predetermined location in the dynamic link program 31b as auxiliary data and the fourth checksum obtained in Step S4 are added together. The resulting sum is set as a thirteenth checksum.

[S14] A checksum (fourteenth checksum) of the entire data in the RAM 103 including the actually loaded dynamic link program 31b which may have developed abnormality after being compiled is calculated.

[S15] It is determined whether the thirteenth checksum obtained in Step S13 coincides with the fourteenth checksum obtained in Step S14. If the two checksums coincide (YES), it is concluded that no abnormality has occurred in the dynamic link program 31b after compiling, and the flow proceeds to Step S16. On the other hand, if the thirteenth and fourteenth checksums do not coincide (NO), it is concluded that the dynamic link program 31b has developed abnormality after being compiled. Accordingly, the dynamic link program 31b stored in the external storage device 105 is deleted and a forced termination signal is output to the shell, followed by termination of the process.

[S16] The dynamic link program 31b is executed.

[S17] When the execution of the dynamic link program 31b is completed, a normal termination signal is output to the shell and the process is ended.

As described above, the application program 31a or dynamic link program 31b which has been destroyed by a computer virus or has suffered a bit error or burst error is detected in Step S5 or S15, and execution of such program is inhibited, whereby the reliability of the computer system is improved.

In the above embodiment, the application program 31a and the dynamic link program 31b are used as the object program 31, but a resident program such as a device driver or a shell program may alternatively be used as the object program 31.

The first calculating unit 11 and the second calculating unit 13 are each designed to acquire the checksum of all memory areas of the main memory 20. Alternatively, they may be designed to obtain the checksum of certain memory areas of the main memory 20, e.g., an area ranging from the head address of the main memory 20 to the last address of the object program 31.

Further, in the foregoing embodiment, a hard disk drive unit is used as the storage unit 30 (i.e., the external storage device 105), but a flexible disk drive unit, magneto-optic disc drive unit or the like may be used instead. Alternatively, a nonvolatile memory may be used as the storage unit 30. In the case of using a flexible disk drive unit, magneto-optic disc drive unit or the like, the access speed can be increased, and in the case of using a nonvolatile memory, the object program 31 etc. can be prevented from being lost even when an accident such as power failure occurs. Furthermore, a ROM may be used for the storage unit 30. The use of a ROM is effective in that, when a burst error occurs while the object program 31 etc. are copied from the ROM to the main memory 20 (i.e., the RAM 103) due to external noise such as alpha rays or impulses, execution of such erroneous programs can be inhibited.

Moreover, the storage unit 30 may be constituted by another computer system connected via a communication line. In this case, if any one of object programs stored in a plurality of computer systems connected to the network has been destroyed by a computer virus or has suffered a bit loss or burst error, execution of such a faulty program can be inhibited without fail.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus for verifying programs by copying an object program stored in external storage unit to a main memory and for controlling execution of the object program, said apparatus comprising:

first calculating unit, coupled to the main memory, for calculating, as a first checksum, a checksum of data which is stored in the main memory before the object program is loaded into the main memory;

program copying unit for making a copy of the object program stored in the external storage unit and loading the copy into the main memory after the first checksum is calculated by said first calculating means;

adding means for adding the first checksum and a second checksum to obtain a third checksum, the second checksum being obtained when the object program is generated by compilation and is affixed to the object program as auxiliary data;

second calculating means, coupled to the main memory, for calculating, as a fourth checksum, a checksum of data stored in the main memory after the object program is loaded into the main memory by said program copying means; and execution control means for comparing the third checksum with the fourth checksum, for executing the object program when the third checksum coincides with the fourth checksum, and for inhibiting execution of the object program when the third checksum does not coincide with the fourth checksum.

2. The apparatus according to claim 1, wherein said first calculating unit and the second calculating means each comprise unit for calculating the checksum of data stored in a predetermined memory area of the main memory.

3. The apparatus according to claim 1, wherein said execution control means comprises unit for deleting the object program stored in the external storage unit when the third checksum does not coincide with the fourth checksum.

4. The apparatus according to claim 1, wherein said object program comprises a resident program including a device driver.

5. The apparatus according to claim 1, wherein said object program comprises an application program.

6. The apparatus according to claim 5, wherein said object program further includes a dynamic link program contained in the application program.

7. The apparatus according to claim 1, wherein said external storage means comprises one of a ROM and a nonvolatile memory.

8. The apparatus according to claim 1, further comprising a communication line coupled to said external storage means; and wherein at least two computer systems are connected to the communication line.

9. The apparatus according to claim 1, wherein said external storage means comprises a flexible disk drive unit.

10. The apparatus according to claim 1, wherein said external storage means comprises a hard disk drive unit.

11. The apparatus according to claim 1, wherein said external storage means comprises a magneto-optic disc drive unit.

12. The apparatus according to claim 1, wherein said first calculating means and the second calculating means each comprise unit for calculating the checksum of data stored in a whole area of the main memory.

13. A method of verifying programs by copying an object program stored in external unit to a main memory and controlling execution of the object program, said method comprising the steps of:

calculating a first checksum of data which is stored in the main memory before the object program is loaded into the main memory;

loading a copy of the object program stored in the external storage unit into the main memory;

adding the first checksum and a second checksum to obtain a third checksum, the second checksum being obtained when the object program is generated by compilation and is affixed to the object program as auxiliary data;

calculating a fourth checksum of data stored in the main memory after the object program is loaded into the main memory; and one of executing the object program when the third checksum coincides with the fourth checksum and inhibiting execution of the object program when the third checksum does not coincide with the fourth checksum.

* * * * *

UNITED STATES PATENT AND TRADEMARK OFFICE
CERTIFICATE OF CORRECTION

PATENT NO. : 5,598,530
DATED : January 28, 1997
INVENTOR(S) : Takaaki NAGAE

It is certified that error appears in the above-indentified patent and that said Letters Patent is hereby corrected as shown below:

<u>Column 1</u>

Line 33, "specificaly" should be --specifically--.

<u>Column 6</u>

Line 67, "unit" should be --means--.

<u>Column 7</u>

Line 3, "unit" should be --means--;

Line 7, "unit" should be --means--;

Line 8, "unit" should be --means--;

Line 29, "unit" should be --means--;

Line 30, "unit" should be --means--;

Line 33, "unit" should be --means--;

Line 34, "unit" should be --means--.

<u>Column 8</u>

Line 18, "unit" should be --means--;

Line 29, "unit" should be --means--.

Signed and Sealed this

Twenty-second Day of April, 1997

Attest:

BRUCE LEHMAN

*Commissioner of Patents and Trademarks*

*Attesting Officer*